United States Patent [19]
Munters

[11] 3,847,578

[45] Nov. 12, 1974

[54] APPARATUS FOR DRYING COMPRESSED AIR

[76] Inventor: Carl Georg Munters, 3, Danderydsvagen, Stocksund, Sweden

[22] Filed: May 6, 1971

[21] Appl. No.: 140,934

Related U.S. Application Data
[63] Continuation of Ser. No. 669,011, Sept. 20, 1967, abandoned.

[30] Foreign Application Priority Data
Mar. 29, 1967  Sweden .............................. 4313/67

[52] U.S. Cl. ...................................... 55/390, 55/62
[51] Int. Cl. ............................................ B01d 53/06
[58] Field of Search ............... 55/33, 34, 62, 58, 77, 55/179, 390

[56] References Cited
UNITED STATES PATENTS

| | | | |
|---|---|---|---|
| 2,993,563 | 7/1961 | Munters | 55/34 |
| 3,192,687 | 7/1965 | Silva et al. | 55/33 |
| 3,292,346 | 12/1966 | Adams | 55/33 |
| 3,490,201 | 1/1970 | Colvin et al. | 55/33 |

Primary Examiner—Charles N. Hart

[57] ABSTRACT

Means for drying compressed air in which the hot compressed air is cooled in a condenser to condense moisture and a main stream passed through preferably a rotary sorber partitioned into a main drying zone while a side stream is heated and passed through a rotary partitioned regeneration zone, the regeneration gas after cooling being recycled to the main stream or separately dried.

2 Claims, 7 Drawing Figures

INVENTOR
CARL GEORG MUNTERS
BY
Sol B. Wiegs
ATTORNEY

INVENTOR
CARL GEORG MUNTERS
BY
Sol B. Wiess
ATTORNEY

APPARATUS FOR DRYING COMPRESSED AIR

This application is continuation of Ser. No. 689,011 filed Sept. 20, 1967 and now abandoned.

This invention relates to an apparatus for drying compressed air.

More particularly this invention relates to an apparatus for drying compressed air, which in a main stream is conducted through a drying or dehydration zone provided in a continuously operating regenerative sorption apparatus or moisture exchanger. A partial stream of this air is heated and conducted through a regeneration zone in the apparatus and precipitated moisture, in a condenser, is taken up by said stream and is recycled to the sorption apparatus.

When air is compressed to high pressure, such as for example 7 kilograms per square centimeter, its moisture content per cubic meter will be increased so many times as the pressure is increased over atmospheric. If thus the uncompressed atmospheric air has a moisture quantity corresponding to a vapor pressure of 10 mm Hg. the moisture quantity in the compressed air in this example will increase seven times; that is to a vapor pressure of 70 mm Hg. The compression takes place with increase of temperature; if it is adiabatic and conducted in one step the final temperature in the example will be about 260°C. When thereupon the compressed air is cooled, as is usually done prior to the utilization thereof, water is precipitated, the compressed air being permanently saturated with water vapor during this cooling step. The cooling is usually conducted so that the temperature does not fall below 0°C in order to avoid formation of ice in the condensers. In most cases the refrigerant used in cooling of the compressed air is ambient atmospheric air or water from the water supply system or at places short of water, from a cooling tower. Considerable disadvantages are, however, inherent in this method of cooling air. The cooled air will have a very high relative moisture content which will have the effect of corrosion on the metal surfaces with which the compressed air comes into contact. A still more serious disadvantage is that direct moisture condensation may occur if the compressed air during its advance to the places of consumption passes through cold spaces. In such a case the conduits may be choked with ice so that parts of the conduit system may be totally or partly blocked from supply of compressed air. The precipitation of condensate is also adapted to impair the operative properties of pneumatic tools, for example by lubricating oil becoming diluted by or entrained with the condensate so that jamming of movable parts may occur.

A considerable improvement of these conditions is obtained by improving the cooling operation described hereinbefore by adding a drying or dehydration step after the cooling step by means of a sorption drying aggregate which is capable of considerably lowering the moisture content without use of refrigeration, whereby frost formation can be avoided. In the above mentioned known method the partial stream to be regenerated is caused to pass through a pressure reducing valve before it is heated and conducted through the regeneration zone of the sorption apparatus. The reason for this proceeding resides probably in the assumption that the compressed air had to expand to lower pressure in order to lower its relative moisture content so that the required drying effect in the regeneration zone be attained. For rendering possible to recycle the regeneration air, a compressor thus had to be used which implies rather considerable additional work accompanied by creation of great pressure differences in the sorption apparatus between said two zones which differences to a high degree increase the stresses on the sealings and bearings of the apparatus.

One main object of the invention is to provide an apparatus for the drying of compressed air which is economic in operation, makes a thorough dehydration of the compressed air possible and further can be practized with relatively simple and reliable means without any appreciable losses.

Another object of the invention is to provide an apparatus for the drying of compressed air in which the partial air stream intended for the regeneration has substantially the same pressure as the air under dehydration so as to keep the losses through leakage at a very low level.

Further objects and advantages of the invention will become apparent from the following description, considered in connection with the accompanying drawings which form part of this specification and of which:

In the various figures the same reference numerals have been used for equivalent parts.

Figure 1:
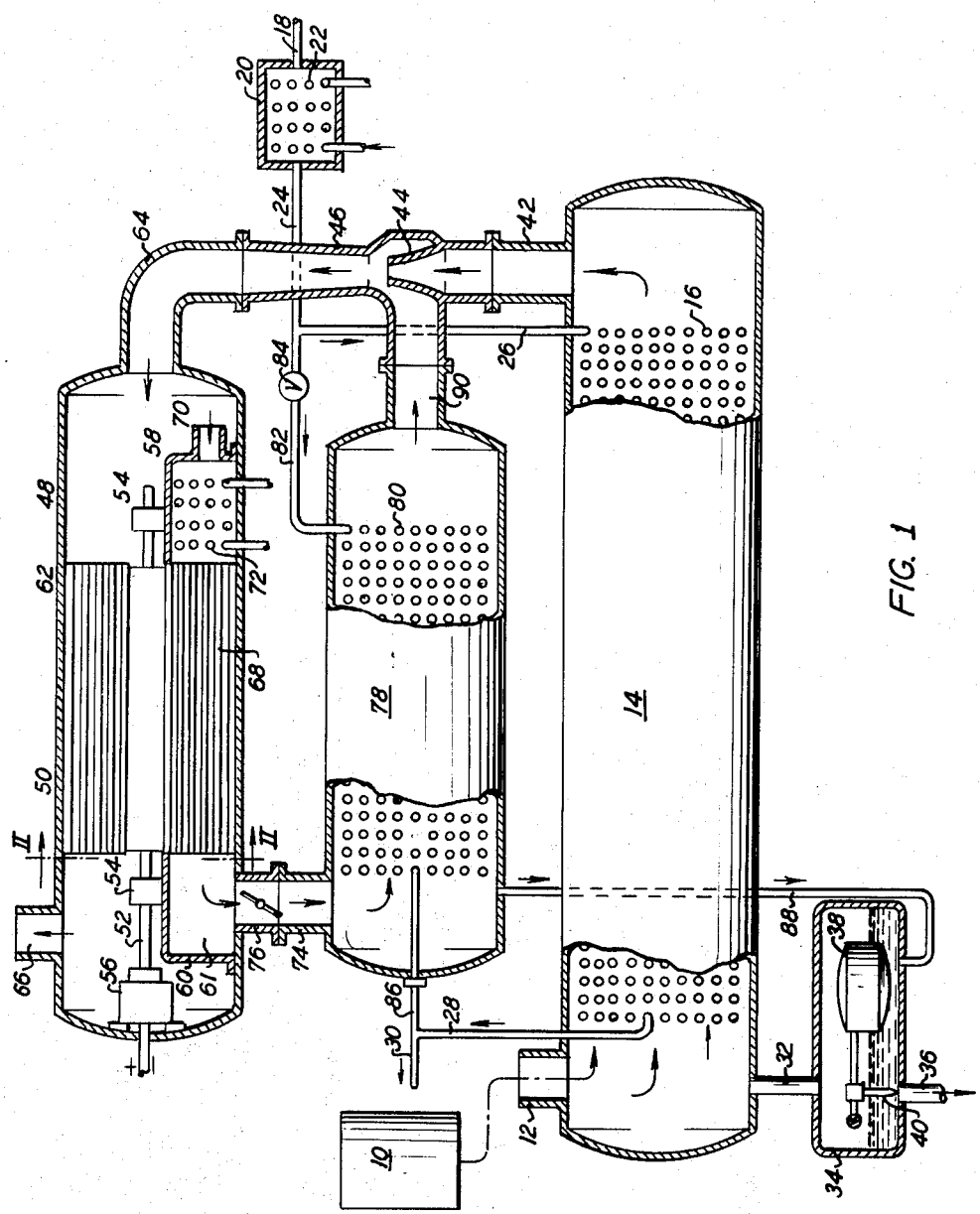
FIG. 1 is a part-sectional side elevation of an apparatus suited for carrying out the method of the invention.
Figure 2:
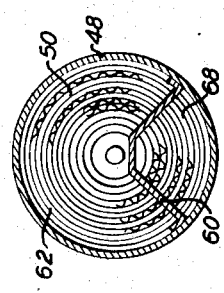
FIG. 2 is a sectional view along the line II—II of FIG. 1.

Referring to the embodiment shown in FIGS. 1 and 2, reference numeral 10 denotes a compressor which may be of the two-step type, for example, and in which atmospheric air is compressed to 7 superatmospheres, for example. By the compression, the air is given a considerable elevated temperature, such as of 120°C and higher. The hot compressed air is conducted through a jacket 12 into a condenser 14 having a tube system 16 passed by a liquid cooling agent, preferably water. The cooling water enters through a conduit 18, a cooler 20 containing a tube system 22 which is passed by a pressure liquid from a refrigerating machine (not shown). In this way the water can be cooled down to nearly 0°C. The cooler 20 is connected by tubes 24, 26 with the tube system 16 and the water upon passage therethrough returns through a tube 28 and a tube 30 to the intake side 18 of the cooler 20 under the action of a circulation pump not shown. During its passage through the condenser 14 the warm compressed air is subjected to a cooling action causing condensate to be precipitated. At the discharge side of the condenser, the temperature of the compressed air may be 10° to 20°C. The main part of the moisture content of the compressed air is precipitated in the condenser 14, but there still remains a considerable quantity of moisture, the removal of which to an essential degree is to be effected by application of the present invention.

The condensate is discharged through a tube 32 to a container 34 having an outlet 36 controlled by means of a valve body 40 guided by a float 38, said body thus opening the outlet when the water level in the container exceeds a predetermined upper limit value and closes it again at a predetermined lowest limit value.

The compressed air continues through a conduit 42 housing an ejector having a nozzle 44 and an ejector tube 46, to a drying or dehydrating apparatus or moisture exchanger 48 of the regenerative sorption type. Mounted within the apparatus is a rotatable moisture exchanger body 50 supported by a shaft 52 in bearings 54 and driven by an electric motor 56 combined with a gearing, the outgoing shaft of which has a low number of revolutions, such as one or a few revolutions per hour or even lower. The moisture exchanger body 50 may have the structure described, for example, in my U.S. Pat. Nos. 3,231,409 and 3,307,617 granted Jan. 25, 1966 and Mar. 7, 1967, respectively. According to said patents the body or rotor 50 is composed of alternately plane and pleated or corrugated thin sheets of asbestos which form between them fine channels extending through the body and which are used as support or carrier for a hygroscopic substance such as lithium chloride, for example.

Adjacent each end wall of the moisture exchanger rotor 50 is a partition wall 58 and 60, respectively, which partition walls subdivide said rotor into a larger drying zone 62 (see in particular FIG. 2) which is passed by compressed air entering the drying apparatus 48 through a conduit 64 and a minor regeneration zone 68. During its axial flow through the channels of the rotor 50, the compressed air is dehydrated to a low absolute and relative moisture content before being discharged through a conduit 66 to the place of utilization.

The minor sector 68 formed by the partition walls 58 is used as regeneration zone. Compressed air is introduced into the regeneration zone 68 through an opening 70 at the intake side of the drying apparatus.

The space defined by the partition walls houses a heating device, hereinafter to be denoted as radiator 12 and intended to heat the regeneration air to a predetermined high temperature, such as 75°–125°C, so that said air becomes capable during its passage through the channels of the rotor effectively to remove the moisture absorbed by the rotor in the drying zone 62. The regeneration air stream which thus has been heated and after its passage through the rotor 50 has an increased moisture content escapes through the space 61 defined by the partition wall 60 to a condenser 78 through a conduit 74 within which an adjustable throttling device in the form of a damper 76 is mounted.

Both the rotor 50 and its driving motor 56 are wholly encased within the drying apparatus 48 which renders the sealing problem mastered, since no movable elements pass through the housing of the drying apparatus.

The condenser 78 is provided with a tube system 80 fed by a cooling agent such as water through a tube 82 which is connected to the tube 24 and controlled by a valve 84. The cooling agent streams through the tube system 80 (in the same manner as in the condenser 14) counter-current to the flow direction of the air, and is discharged through a tube 86 connected with the tube 30. In the illustrated embodiment, there is effected a cooling of the regeneration air in condenser 78 to the same or substantially the same temperature as that prevailing in condenser 14. Moisture picked up by the regeneration air from the drying rotor 50 is precipitated in condenser 78 and is drained off through a tube 88 into container 34.

The regeneration air which thus has been cooled and partially dried is sucked by pressure reduction of ejector 44 into venturi by way of, 46 conduit 90 and thence passes into the main stream in conduit 64. The passage of the regeneration air stream through the circulation circuit described hereinbefore and comprising the radiators 72, the regeneration zone of the rotor 50 and the condenser 78 causes flow losses and thereby a pressure drop so that the pressure at the outlet 90 from the condenser 78 is lower than in the outlet 42 from the condenser 14 or the inlet 64 to the drying apparatus 48. Due to the action of the ejector 44, 46, the regeneration air is entrained by the main stream of compressed air, the existant pressure difference being overcome thereby.

This difference in pressure is small and can therefore be overcome by an insignificant power consumption in the ejector 44, 46. The difference in pressure is further reduced by the lower dimensions of the condenser 78 which only needs to cool the regeneration air. The feature that the condenser 78 constitutes a separate element in relation to the condenser 14, allows later installation and easy modification of already existing compressor apparatus having both a compressor 10 and a condenser 14.

Due to the arrangement of the components of the apparatus and the directions of flow during the passage of the two streams of the compressed air through the rotor, a minimum demand of driving power for the circulation of the regeneration stream is required and such a pressure balance is maintained over the partition walls 58 and 60 that a possible leakage will occur in the direction from the main air stream to the regeneration stream while at the same time these differences in pressure can be kept at the lowest possible level.

Figure 3:
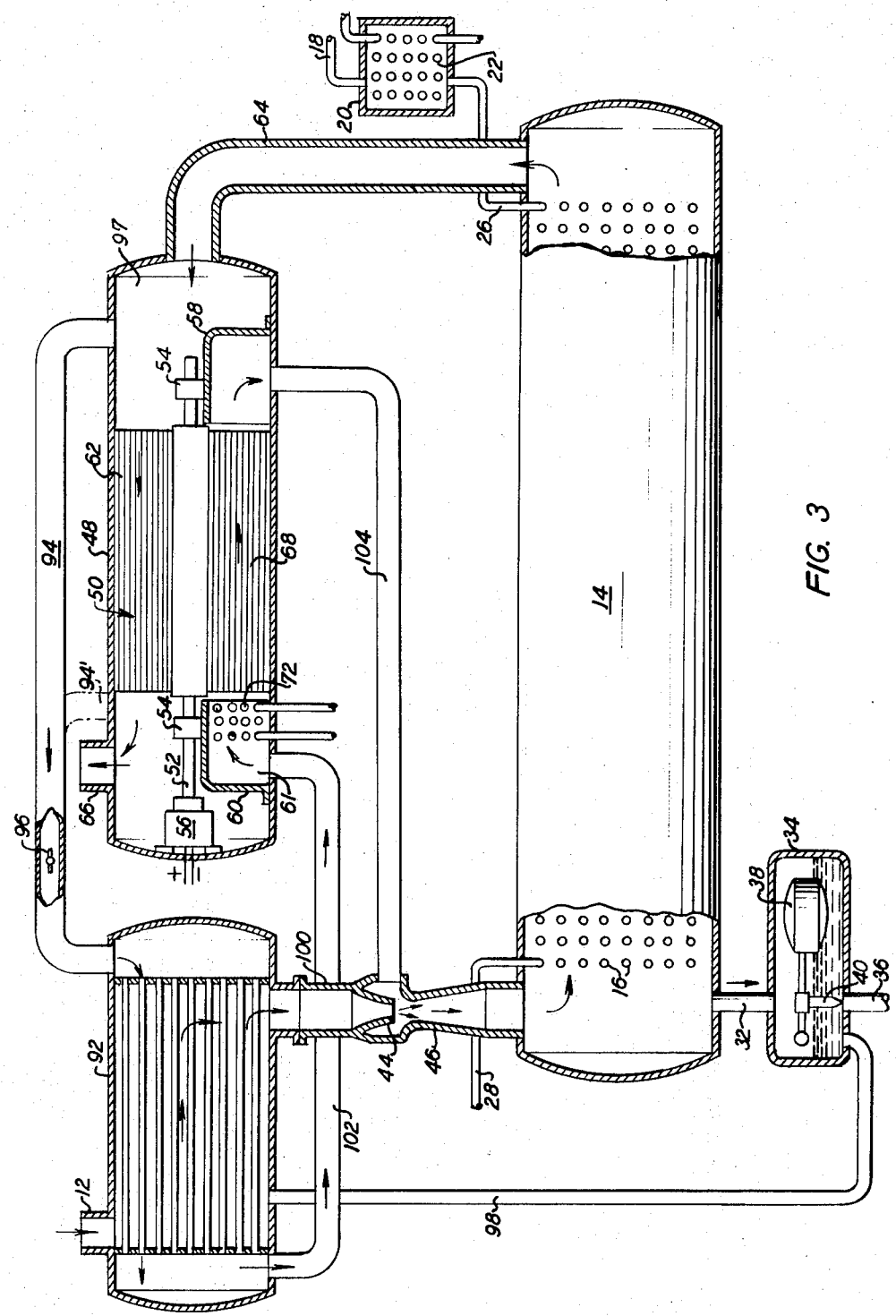
FIGS. 3–6 are part-sectional side elevations of four additional embodiments of the invention.

The embodiment shown in FIG. 3 includes a heat exchanger 92 having two channel systems separated from one another of which systems one is passed by the compressed hot air from the compressor 10 (FIG. 1) and enters through jacket 12. The other channel system is passed by that compressed air which is intended to serve as regeneration air and which can be introduced into the heat exchanger 92 through a conduit 94 provided with a throttling means such as a damper 96 and which is connected to the intake side 97 of the drying apparatus 48. The entering hot compressed air and the regeneration air from the conduit 94 meet one another in a counter-current within but separated heat exchange flow within the heat exchanger 92, which results in preheating regeneration air while the compressed hot air is subjected to a cooling action resulting in a partial precipitation of water. This water is discharged through a tube 98 into container 34.

In this embodiment the ejector 44, 46 is mounted in a conduit 100 connecting the heat exchanger 92 with the condenser 14. The pre-cooled compressed air flows through a conduit 100 to the condenser 14, where it is subjected to additional cooling and dehydration by means of the cooling agent streaming through the tube system 16 from the cooler 20 in the manner described hereinbefore.

The pre-heated regeneration air is discharged from the heat exchanger 92 through a conduit 102 to the space 61 housing the radiator 72 of the drying apparatus 48. Said radiator is thus positioned at the opposite side of the rotor 50 compared with the preceding embodiment which feature implies that the regeneration air stream passes through the rotor in counter-current to the main air stream in the driving zone 62. The regeneration stream after having passed through the space 68 of the rotor 50 is discharged through a conduit 104 to the ejector 44, 46 which provides for the in pressure necessary to compensate for the losses in pressure undergone by the regeneration air stream under its circulation. As mentioned above, these losses are very moderate and according to the invention may amount to so low values as one or a few tenth of a millimeter water column.

According to another useful alternative the regeneration air can be drawn off from the main stream of compressed air after that said air has passed through the drying rotor 50. In this case, the conduit 94 is to be connected to the left-hand of the drying rotor 50 shown in FIG. 3, as is indicated by the dash-dotted lines $94^1$, instead of righthand of said drying rotor. In this alternative embodiment, the regeneration air, when entering the drying zone 68 has a very low absolute and relative moisture content.

In the embodiment shown in FIG. 3 the consumed regeneration air is conducted to the condenser 14 to be cooled and dried. Simultaneously, the hot compressed air discharged from the compressor is pre-cooled by means of the heat exchanger 92. By suitably adjusting the pressure drops of the air streams passing through the rotor, the passage system and the heat exchanger, it is possible with this embodiment also to maintain a balance in pressure over the sealing walls 58, 60 such that possible leakage occurs in the direction from the main air stream to the regeneration air stream.

Figure 4:
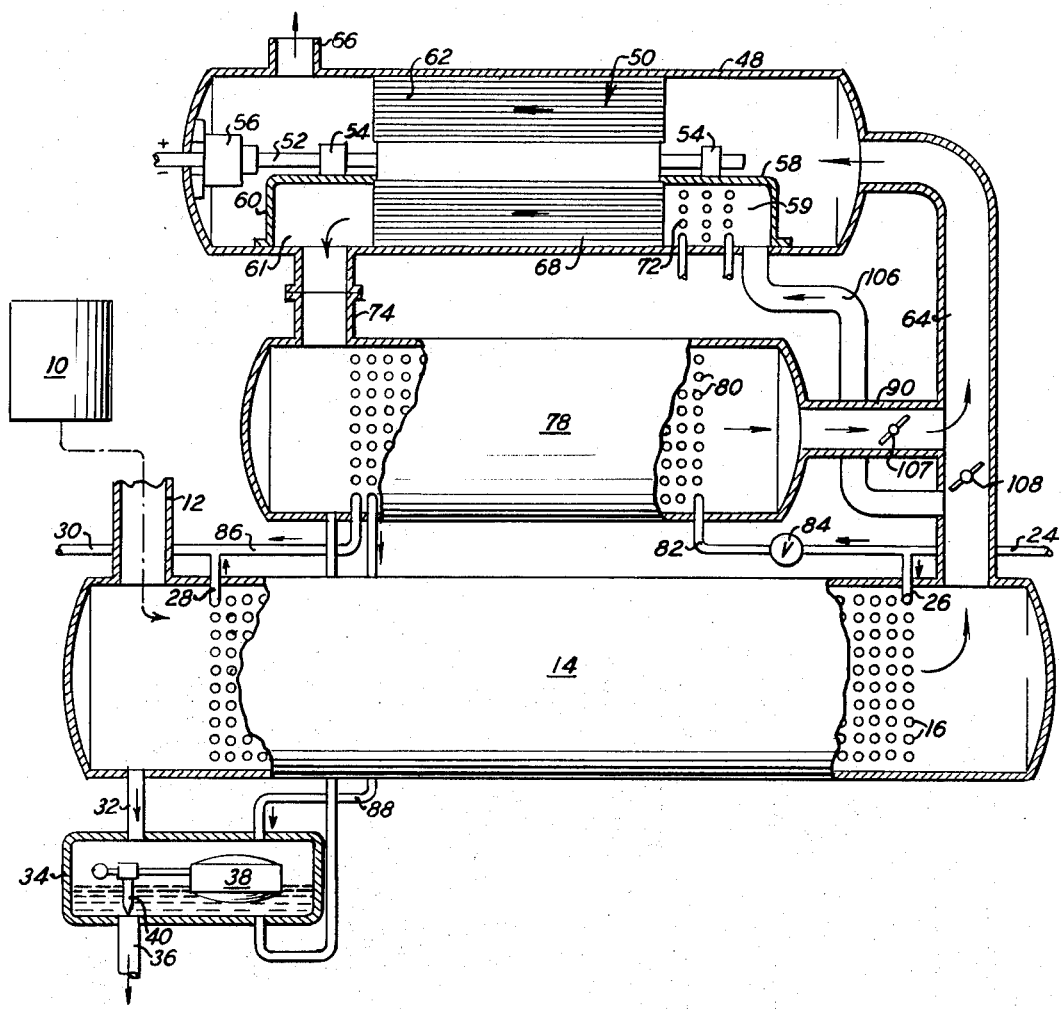

The embodiment shown in FIG. 4 similar to FIG. 1 has a separate condenser 78 for the regeneration air. The flow of regeneration air within the system under recirculation to the main stream of the compressed air is, however, produced in a different manner. A conduit 106 is connected with the conduit 64 connecting the condenser 14 with the intake side of the drying apparatus 48 at a point ahead of a throttling valve 108, in the direction of flow of the air compressed through conduit 64. The conduit 106 bypasses some compressed air into the sector 59 defined by the wall 58 and housing the radiator 72. The discharge conduit 90 from the condenser 78 passes into the conduit 64 on the downstream side of the control valve 108. By adjusting the valve 108, a pressure drop may be produced in the conduit 64 which is sufficient to overcome the losses in pressure in the passage of the regeneration stream through the rotor 50 and the condenser 78. The pressure in conduit 90 may also be controlled by valve 107 to be slightly lower as it joins conduit 64. The pressure drop is thus adjusted so that the regeneration stream passes through the regeneration zone of the drying apparatus 48 with a predetermined intensity.

Figure 5:
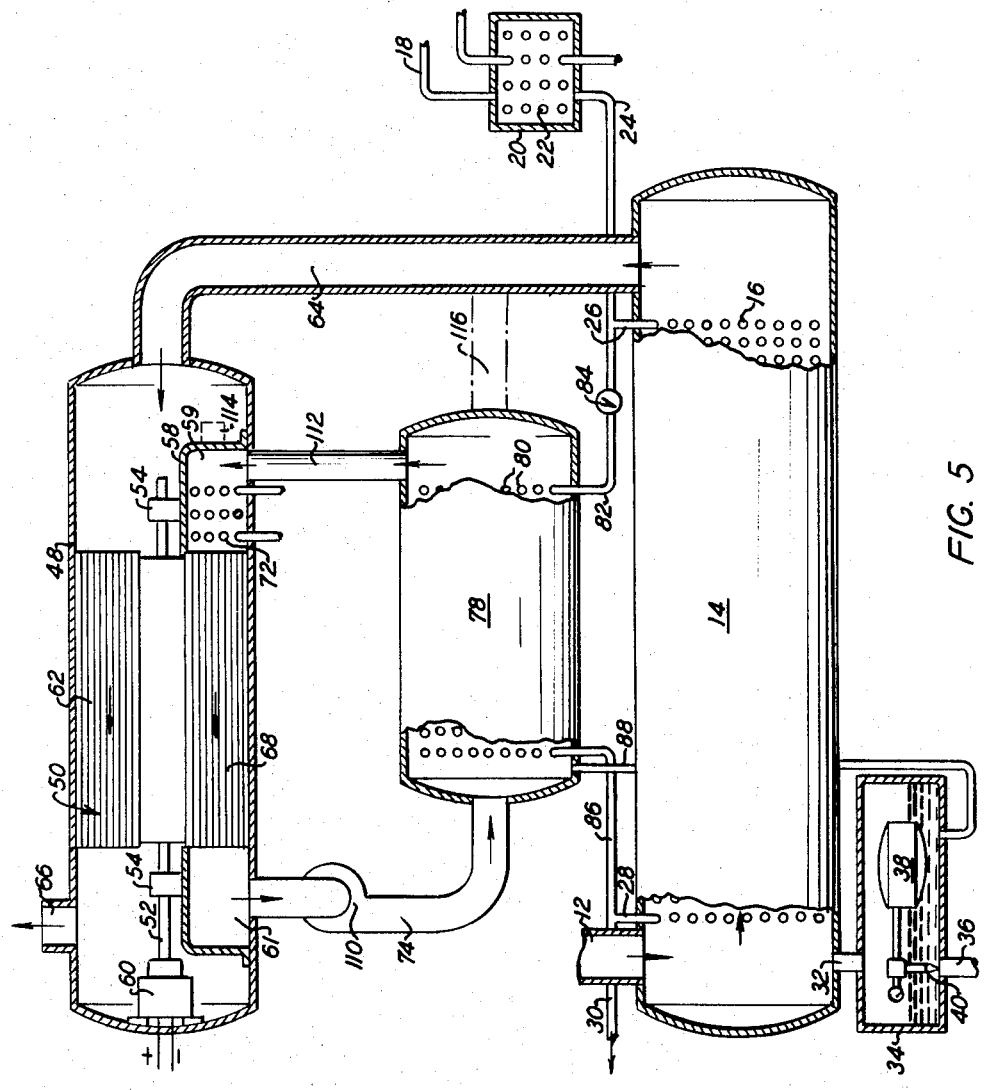

In the embodiments of FIGS. 1 through 4, the inner circulation of the regeneration air is produced by means of an ejector or a throttling device. The embodiment illustrated in FIG. 5 differs by having the regeneration air circulated by a fan 110 which suitably is mounted in the conduit 74 extending from the outlet space 61 of the regeneration zone in the drying apparatus 48 to the condenser 78. In the illustrated embodiment the fluids are in a concurrent stream through the rotor 50 so that the differences in pressure over the seals can be maintained at a very low value in order to prevent leakage. The regeneration air cooled and dried in the condenser 78 is recycled through conduit 112 to the space 59 at the intake side of the drying apparatus 48 in which space also the radiator 72 is located.

It is easily understood that the effect demand of the fan 110 is small, since the fan only has to overcome the resistance against free flow met in the regeneration circuit.

As an alternative it is also possible to supply regeneration air from the main stream through an opening 114 in the partition wall 58, the regeneration air after the passage through the condenser 78 continuing through a conduit 116 to the conduit 64 connecting the condenser 14 with the drying apparatus 48.

Figure 7:
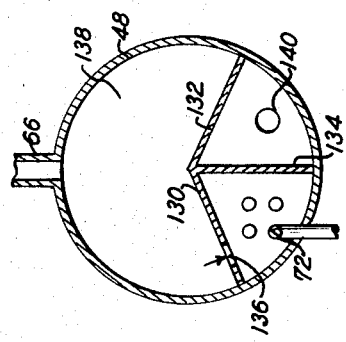
FIG. 7 is a sectional view of the apparatus taken on the line VII–VII of FIG. 6.
Figure 6:
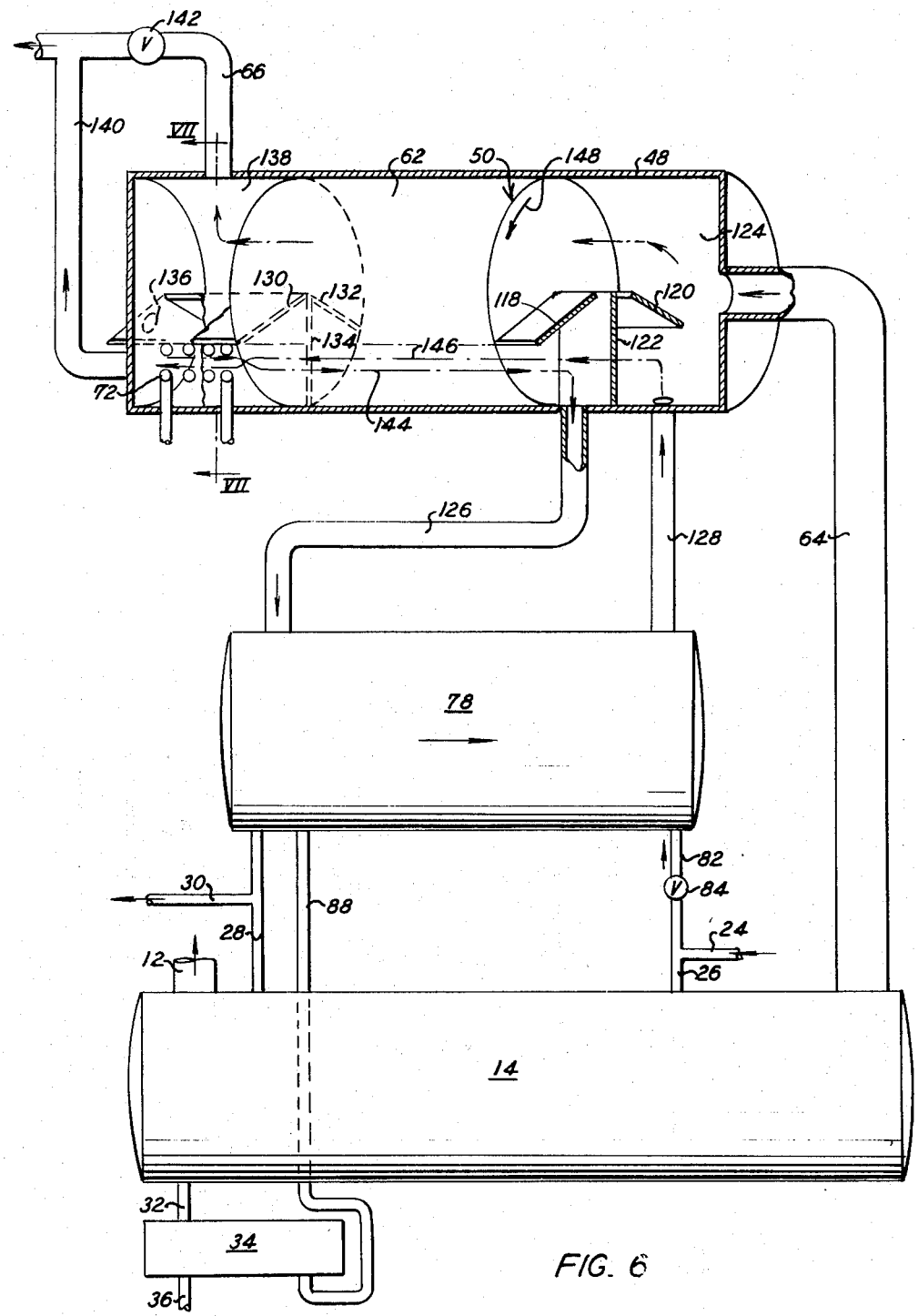

In the embodiment illustrated in FIGS. 6 and 7, the drying apparatus 48 is subdivided into two sectors for the regeneration air which at the intake side are defined by radial partition walls 118, 120, 122 which completely delimit these sectors from the greater sector 124 through which the main stream passes. The sector defined by the walls 118, 122 is connected to the condenser 78 through a conduit 126 and the sector defined by the walls 120, 122 through a conduit 128.

On the opposite side of the drying rotor 50 three partition walls 130, 132 and 134 are provided and define two sections for the regeneration air which are axially in line with the sectors on the intake side. The radiator 72 is located in the space defined by the walls 130, 134, said space through an opening 136 in the wall 130 being in communication with the greater sector 138 for the main stream at this side of the apparatus. A conduit 140 extends from the sector defined by the walls 132, 134 and merges with the discharge conduit 66 from the sector 138, flow through conduit 66 being controlled by a control valve 142 located therein.

In operation of the apparatus illustrated in FIGS. 6 and 7, the pressure drop required for overcoming the losses in pressure in the regeneration circuit is produced by adjustment of the valve 142. The result will be that a slightly higher pressure prevails in the sectors 124, 138 and in the drying zone 62 than in the regeneration circuit. Air is sucked in from the sector 138 through the aperture 136 and is heated by the radiator 72 to be conveyed in the direction of the arrows 144 in FIG. 6 through the nearer sector to the conduit 126 and thence into the condenser 78 which has the same structure as described above and thus cools the regeneration stream and condenses moisture removed by said regeneration stream from the rotor 50. The regeneration stream continues thereafter through the conduit 128 in the direction of the arrows 146 through the more remote sector to be discharged through the conduit 140, in which, as already mentioned, a slightly lower pressure prevails than in the conduit 66.

The regeneration air is dried in its passage in the direction of the arrows 146 of FIG. 6 through the more remote sector to the same low moisture content as the main stream of the compressed air. The direction of rotation of the rotor is indicated by the arrow 148.

For the sake of clarity, the bearing structure supporting the rotor 50 has not been shown in FIG. 6.

While a more or less particular embodiment of the invention has been shown and described, it is to be understood that this is for purpose of illustration only, and that the invention is not to be limited thereby.

I claim:

1. Apparatus for compressing and drying of air comprising a compressor and a condenser, means for cooling the condenser, means for passing warm compressed air to said condenser for condensing moisture therein, a rotary moisture sorption device having a main drying section, a secondary drying section and a regeneration section operative in sequence as said rotary device rotates, means for passing cooled air from which the moisture is condensed from said condenser in a main stream to the main drying section of said rotary sorption device, means for separating a side stream from said main stream, means for heating said side stream, and passing said side stream through said regeneration section for regenerating the same, means for cooling and condensing moisture from the moisture-laden air evolved from said regeneration section and passing said cooled regeneration air to said secondary drying section and means for returning said dried secondary section air and said regeneration air to said main stream.

2. Apparatus for compressing and drying of air comprising a compressor and a condenser, means for cooling the condenser and means for passing warm compressed air to said condenser for condensing moisture therein, a rotary moisture sorption device mounted in a housing provided with flow-through channels and partitioning walls sub-dividing said sorption device into a main drying section, a regeneration air drying section and a regeneration section, means for passing cooled air from which the moisture is condensed from said condenser in a main stream to said main drying section, means for separating a side stream from said main stream, means for heating said side stream and passing the same to said regeneration section, means for passing regeneration air from said regeneration air zone to a condenser, means for passing condensed regeneration air to said partitioned regeneration air drying section in said housing, and means for returning said dried regeneration air evolved from said regeneration air drying section to said main stream after said main stream has passed through said main drying zone.

* * * * *